United States Patent
Nose

[11] 3,805,349
[45] Apr. 23, 1974

[54] THROW-AWAY INSERT FOR MILLING CUTTER

[75] Inventor: Shunzo Nose, Hyogo, Japan

[73] Assignee: Sumitomo Electric Industries, Ltd., Osaka, Japan

[22] Filed: May 1, 1972

[21] Appl. No.: 248,832

Related U.S. Application Data

[63] Continuation of Ser. No. 23,666, March 30, 1970, abandoned.

[52] U.S. Cl............................................ 29/95 R
[51] Int. Cl............................................ B26d 1/00
[58] Field of Search.............................. 29/95, 96

[56] References Cited
UNITED STATES PATENTS
3,434,190   3/1969   Kaiser.................................. 29/95
3,250,154   5/1966   Breuning............................. 29/96
3,514,826   6/1970   Dawkins et al..................... 29/96

Primary Examiner—Leonidas Vlachos
Attorney, Agent, or Firm—Sughrue, Rothwell, Mion, Zinn & Macpeak

[57] ABSTRACT

A metal throw-away insert has a pair of plain, parallel top and bottom surfaces and at least three plain side faces perpendicular to said surfaces and linked together polygonally. A plurality of grooves are provided on the surfaces which with each groove extending along and closely spaced away from the line formed between one of the side faces and one of the surfaces adjoining the same. Each group is uniformly convex and closest at its center portion to the adjoining one with grooves being inwardly inclined to define an acute angle with respect to said one's surface in a direction away from the adjoining line.

1 Claim, 13 Drawing Figures

PATENTED APR 23 1974                    3,805,349

THROW-AWAY INSERT FOR MILLING CUTTER

This is a Continuation, of application Ser. No. 23,666, filed Mar. 30, 1970, now abandoned.

BACKGROUND OF THE INVENTION

1. Field of the Invention

The present invention relates to a throw-away insert for a milling cutter provided with curved cutting edges, with the curved edges maintaining a highly precise finished surface to the milled product even when cutting is performed under a high feeding speed for the cutter itself. More particularly, the present invention relates to an insert having a triangular configuration with a large radius of curvature and providing a long cutting edge without necessarily making the inscribed circle large as well as the mechanism for mounting the inserts on a cutter body.

2. Description of the Prior Art

In milling, a milled surface is achieved by passing of the edges of the cutter along the surface to be milled with the locuses of the cutting edges parallel and the roughness of the work surfaces determined by the configuration of the cutting edges, the feeding speed of the edges and the difference between the edges with respect to height and with respect to the surface to be worked, which difference is referred to as front deviation hereinafter.

It is, however, very uneconomical and impractical, in general, to limit the front deviation to several microns for milling cutters employing throw-away inserts.

Accordingly, an improvement for the edge configuration of the throw-away milling cutter inserts has been proposed. In particular, the use of a wiper insert having a curved edge shape for cast iron is well known. Reference to FIGS. 1A through 1C illustrate a typical example of a throw-away cutter in which a certain number of edges (normally one edge) are replaced by wiper inserts. A curved face 11R in FIG. 1C projects slightly from the cutting edge 12, which lies on the front end face of a conventional insert 10 with the curved face 11R adapted to further cut the surface of the work piece already cut by edges 12 in a shallow, circulary motion to form a very smooth finished surface. This method is highly effective, but from the point of view of the countermeasure for achieving a finished surface in the milling work, the surface or curved face 11R is not completely round. The reason for this is that the locus of the wiper insert is determined by the amount of feed for each revolution of the cutter and, since the larger the diameter of the cutter, the larger number of edges, the amount of feed for each revolution is necessarily increased.

That is, a precise finished surface is insured by using one wiper insert when the diameter of the cutter is relatively small, but is degraded with increase in the diameter of the cutter. To avoid the reduction or degradation in preciseness, an increased number of wiper inserts have been used. In this case, however, the desired result is obtained only when the relative difference in position of the wiper insert with respect to the surface to be worked is smaller than about two to three microns and therefore some regulation apparatus is required to regulate the differences to maintain the above mentioned rate and the regulating operation provides great problems which are very difficult to be resolved in practice.

Turning next to FIG. 2A, the curved faces 21R, 22R and 23R are intended to provide curved cutting edges for all edges of the cutter and, together with the effect of a number of edges which attribute to the finished surface, that is, the number of edges which are positioned within a few microns from the highest edge of the milling cutter and referred to as the effective finish edges, hereinafter, such arrangements are intended to compensate for the disadvantages of the wiper insert. Under this method, however, when a high feed rate is employed, the highly precise finished surface of the work piece is not obtained. The reason for this is that, although the larger radius of the curved cutting edge is present and, hence, a longer cutting edge provides a higher preciseness to the milling process, to achieve the same it is necessary to shorten considerably the linear sides 20, 22 and 24 or make the inscribed circle K of the insert larger. If the linear sides are shortened, there is an adverse effect to the stability of mounting or supporting of the insert because two of the linear sides 20, 22 and 24 are always in pressure contact with the two side faces 15 and 16 of the insert locating seat. Further, since it is necessary to make the inscribed circle K of the insert larger, this necessarily affects the economy in the production of the cutting insert and must, of course, make the locating means for the insert of increased size. Therefore, the number of inserts to be located on a cutter must necessarily be decreased, which is a further disadvantage.

SUMMARY OF THE INVENTION

The present invention compensates for the above mentioned disadvantages by providing a cutter with a throw-away insert capable of providing a high precision finished surface to the work piece with the highest possible feed speeds thereto. Further, since the insert of the present cutter may be readily manufactured, the end result is a remarkably economical cutter.

These and other objects and advantages of the present invention become apparent from the following description of one embodiment of the present invention.

DESCRIPTION OF THE PREFERRED EMBODIMENT

Figure 1A:
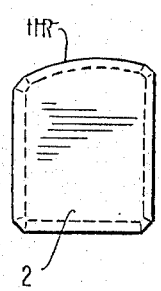
FIGS. 1A, 1B and 1C are, respectively, a prior art example of a wiper insert of a conventional throw-away cutter in plan view, in side view and in side view of the insert as mounted on a locator.
Figure 1B:
Figure 1C:
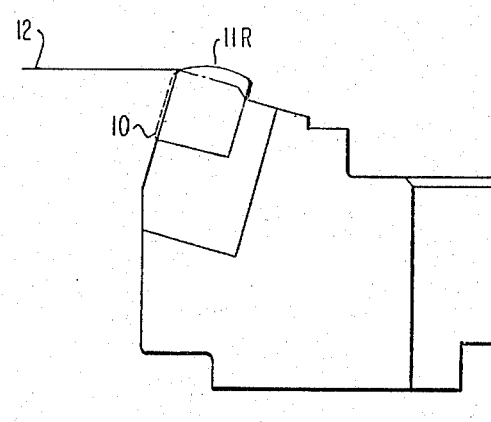
Figure 2A:
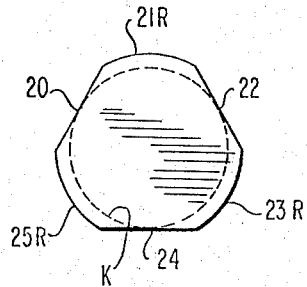
FIGS. 2A, 2B and 2C constitute, respectively, a prior art throw-away cutter utilizing curved cutting edges with the cutter in plan view, in side view and in side view of a locator fixedly holding the throw-away cutter insert.
Figure 2B:
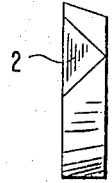
Figure 2C:
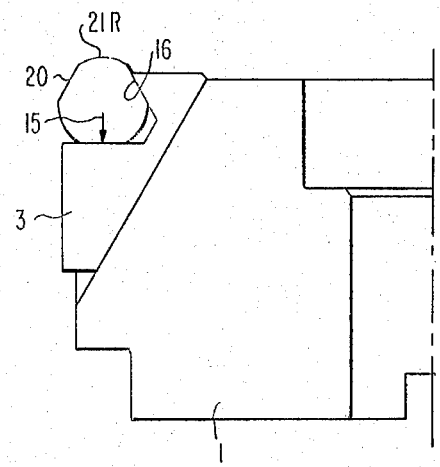
Figure 3A:
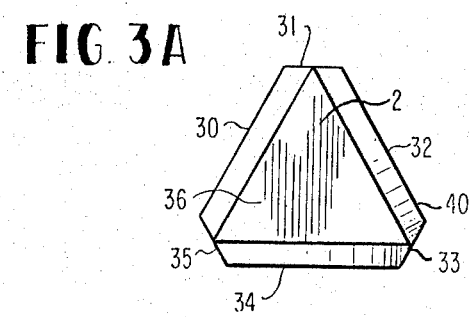
FIGS. 3A, 3B and 3C are, respectively, a plan view of an insert in accordance with the present invention, a side view of the same and a side view of the cutter as positioned or coupled on a locator.
Figure 3B:
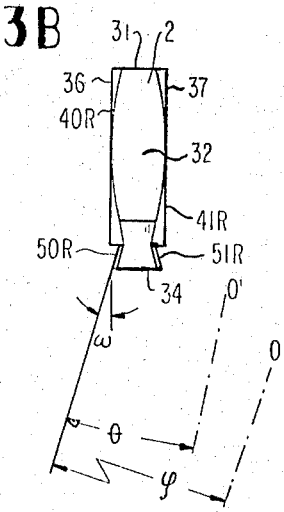
Figure 3C:
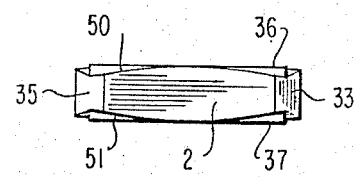
Figure 4:
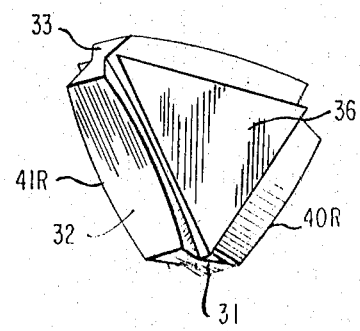
FIG. 4 is a perspective view of the insert illustrated in FIGS. 3A through 3C.

Reference is now made to the drawings, in particular to FIGS. 3A through 4, and insert 2, formed in accordance with the present invention, constitues a metal member which has a plan configuration of generally equilateral triangle and defined by plane faces 30, 32 and 34 and plane faces 31, 33 and 35 formed by removing the respective apex portions of the triangle, along lines parallel to the opposite sides thereof. The numbered faces are perpendicular to the top and bottom plane surfaces 36 and 37.

As shown in FIG. 3B, curved faces 40R, 41R and 50R, along with 51R, etc., are formed on the remaining regions of the top and bottom surfaces of the insert and extend inward, that is, inclined inwardly, from faces 30, 32 and 34 respectively.

Each of the curved faces is a part of either a convex cylindrical surface which cylinder has an axis $o$ and a radius $y$ or convex, conical surface which has an axis $o'$ and a cone angle $\theta$.

In any case, an angle $\omega$ of the curved face relative to the top or bottom surface is very important to the present invention, and it is determined by conditions described below.

Now, the insert according to the present invention acts in its role as a tooth of the face milling cutter when mounted on a cutter body. In this situation, the faces 30, 32 and 34 serve as the relief face of the front cutting edge and the faces 31, 33 and 35 serve in like fashion to the side cutting edge for face milling.

Figure 5:
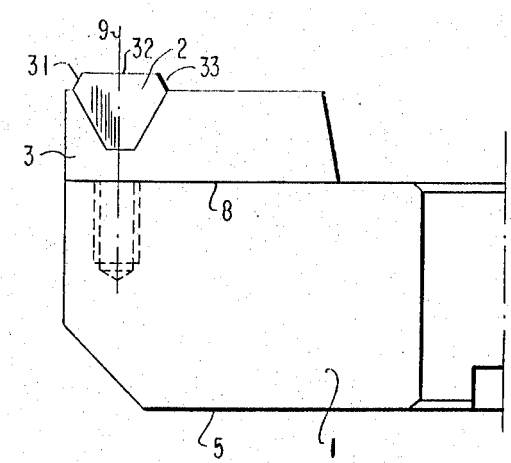
FIG. 5 is a schematic representation of a locator supporting the cutter insert in proper position.

FIG. 5 shows the insert when it is fixed in position on the locator in which the faces 30 and 34 are in pressure contact with the locator walls.

Figure 6A:
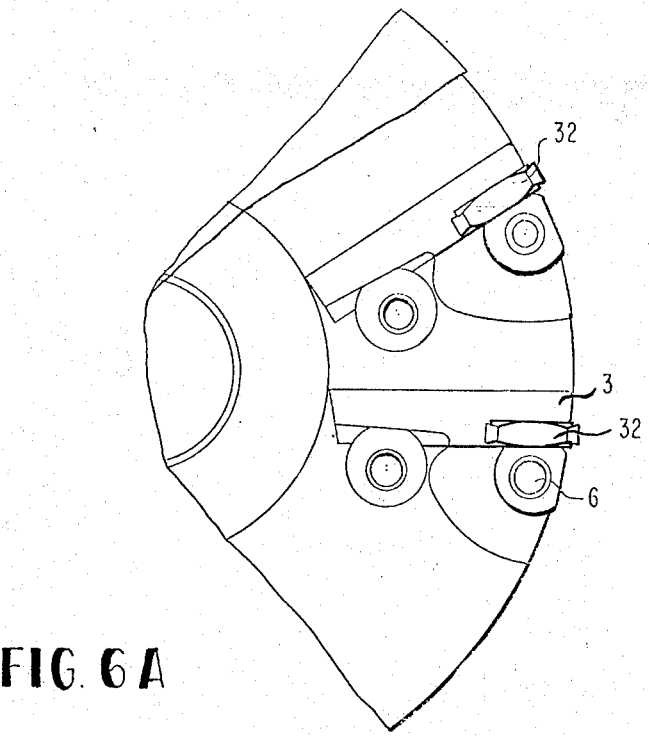
FIG. 6A is a plan view of a throw-away cutter assembly including a plurality of cutter inserts.
Figure 6B:
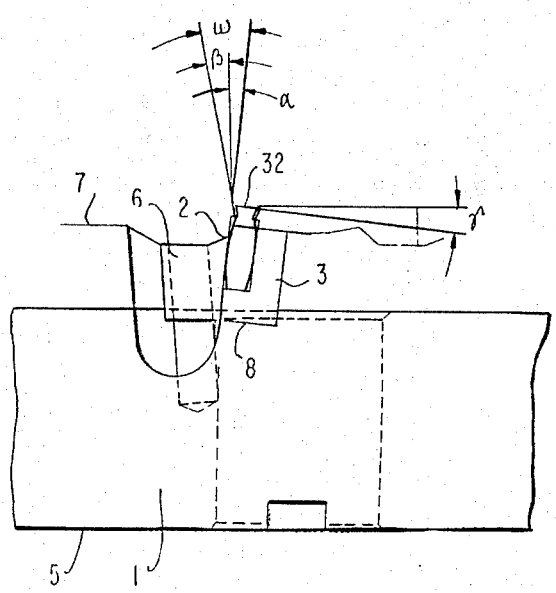
FIG. 6B is a side of a portion of the cutter assembly of FIG. 6A.

FIG. 6A is a front view of the insert 2 of the present invention, when the insert is fixed to the cutter body, while FIG. 6B is a side view of the same. Since the insert 2 of the present invention is fixed to the cutter body with a negative axial rake angle $\alpha$ with respect to the axis of the cutter, the face 32 in FIG. 6B serves as a relief face for the front cutting edge providing a relief angle $\gamma$ where $\gamma = d$, and the remaining two faces 30 and 34 serve as locating faces for contact with the locator walls. Since the convex faces 40R, 41R, 50R and 51R etc., are cut on the top and bottom surfaces 36 and 37 inwardly from the edges thereof, and serve as rake face for the front cutting edge, the gradient angle $\omega$ of these convex surfaces is selected in such a way that it provides the optimum rake angle $\beta$ where $\beta = \omega - a$.

The angle $\delta$ or $\alpha$ is preferably 5°–7° for a cemented carbide insert, but may never be zero due to the requirement for the provision of a real relief angle. Now, the joining line of the relief face (plane) and the rake face (convex cylinder or convex conical face), that is, an edge line becomes a plain curve. Also, the effective form of the cutting edge is the projected figure of this plane curve in the direction of $\delta$ inclination. As apparent from mathematical calculation, the radius of the projected curve is greatly enlarged, and the enlarging ratio becomes approximately 10 times the radius of the convex cylinder surface cut on the face plane when the angle $\delta$ is selected as mentioned previously from 5° to 7°. That is, the effective radius of curvature in cutting is increased by ten times or more by giving some fixing angle to the insert.

Since the curved face forming device or forming tool (for instance, a metallic mold) may be constructed in accordance with the real radius (not the effective radius) of curvature, it is apparent that the working apparatus for manufacturing the device or tool is simplified and the method of manufacture is also greatly facilitated.

In addition to the above mentioned advantages, it should be noted that in the present invention, the side faces of the insert, which serve as relief faces providing curved cutting edges, themselves serve as supporting side faces which are in pressure contact with the locator walls. Under this arrangement, the requirements that the curved cutting edge be long enough without materially affecting the necessity that the supporting side faces of the insert be flat and, also, long enough, are realized without any inconsistency to both ends. In this way, the present invention solves the economic advantage of conventional inserts due to their large inscribed circle.

Further, according to the present invention, both the top and bottom surfaces of the insert may be obviously used to provide cutting edges. The insert shown in FIG. 3A has, accordingly, six edges which may be utilized as cutting edges. That is, the insert in accordance with the present invention is characterized by top and bottom surfaces which may be utilized to define cutting edges, and it is provided with the important conditions necessary to obtain a higher precision finished surface at high feed speeds for the cutter as compared to conventional inserts. It should be noted that although the insert of the present invention is described in connection with the embodiment shown in the drawings in which, (in plan view), the insert takes the form of an equilateral triangle, and, although it has been found that such configuration is most effective, other configurations having equilateral polygonal shape, such as being tetragonal and hexagonal, are applicable to the present invention.

Another feature of the present invention resides in a provision of a cutter assembly in which the present inserts are most effectively mounted to the cutter body.

The structure of the cutter, and in particular the mounting method or mechanism available to the present inserts and carried by the cutter body, is described in connection with FIGS. 5, 6A and 6B. In order to allow the inserts of the present invention to exhibit their stable effects, the center portion of the arc of each curved cutting edge should be in correct contact with the work surface and to increase the function of the tool as a finishing cutter, the cutter body should be machined precisely so that the number of the effective finish edges becomes as large as possible.

In FIG. 6B, grooves 8 provided on the cutter body are designed in such a way that each groove is parallel with the bottom end face of the cutter body in the radial direction. Locators 3 are fixed in the respective grooves on the cutter body so that the angle between the locating seat faces of each locator which are adapted to be in pressure contact with the two faces of the insert and hold the latter, is divided into two exact equal angles by an imaginary line drawn normal to the bottom end face 8, which line is indicated by a reference number 9 in FIG. 5.

The bottom face 8 is maintained in exact parallelism with the side face 32 of the insert which is not in contact with the locator walls but acts in this case as the cutting edge. Clamping means 6 is employed to fix the insert coupled to the locator and is actuated in the same direction as that of the imaginary normal line 9 to the bottom face 8.

With the above described arrangement of the locator, the cutter body and the associated members provides the following advantages during the actual use of the same. Since the bottom end face 5 of the cutter body becomes a reference surface for the work surface, the cutting of the grooves which are in parallel with the end face may be easily performed with extremely high precision, although the grooves themselves adversely affect the front deviation of the cutter. Due to the fact that the bottom face 8 of the locator is parallel with the side face 32 of the insert, the working of the bottom of the locator on the reference of the insert may be easily performed with exact parallelism and with high dimensional precision.

Accordingly, even in the assembled state, the precision of the assembly satisfied both of the above mentioned points, that is, the contact of the center portion of the arc of the curved cutting edge of the insert with the work surface and the precision machinery of the cutter body to provide a large number of effective finishing edges for the cutter, is achieved with precision and with high durability, even when the assembly is actually used over long periods of time.

Since the acting direction of the clamping means 6 is consistent with the acting angle 9 which serves to pressure the insert in contact with the locator wall faces, no extra pressure is needed for the pressure contact therebetween to maintain the insert in its exact required position. From the previous description, it will be apparent that the present throw-away cutter insert provides superior finishing surfaces with maximum stability in comparison with the conventional throw-away cutters.

It has been found experimentally that the finished surface which is equal to or superior to that obtained when the feed speed and the diameter of the cutter are 17 mm per minute and 12 inches respectively, and is equal of superior to 6S when these parameters of 500 mm per minute and 8 inches.

Only one limitation is inherent to the present cutter. That is, since the portions 31, 33 and 35 of the insert which serve as peripheral cutting edges are small, relatively deep cutting cannot be performed by the cutting inserts. Accordingly, the present cutter may be used as a finish cutter very conveniently and is particularly suitable to obtaining a high precision finished surface in milling cast iron or the like with maximum efficiency.

I claim:

1. A throw away milling cutter insert comprising: an element having a pair of plane parallel top and bottom surfaces, six plane side faces extending perpendicular to said top and bottom surfaces, said side faces forming an irregular hexagon and comprising three short side faces of equal length and three long side faces of equal length, grooves formed along the joining line between said top and bottom surfaces and respective long side faces, each of said short side faces being formed by cutting three apices of a regular triangle parallel with their respective base planes to the extent of the width of said grooves, each groove being uniformly convex and closest at its center portion to its joining line and being inwardly inclined at an acute angle with respect to its respective top or bottom surface in a direction away from said joining line.

* * * * *

UNITED STATES PATENT OFFICE
CERTIFICATE OF CORRECTION

Patent No. 3,805,349      Dated April 23, 1974

Inventor(s) Shunzo Nose

It is certified that error appears in the above-identified patent and that said Letters Patent are hereby corrected as shown below:

In the heading, the claims to priority were omitted. Should be:

--- March 31, 1969 Japan .................... 23874/69 ---
--- January 31, 1970 Japan .................... 8757/70 ---

Signed and sealed this 17th day of September 1974.

(SEAL)
Attest:

McCOY M. GIBSON JR.             C. MARSHALL DANN
Attesting Officer                Commissioner of Patents